United States Patent Office 3,207,690
Patented Sept. 21, 1965

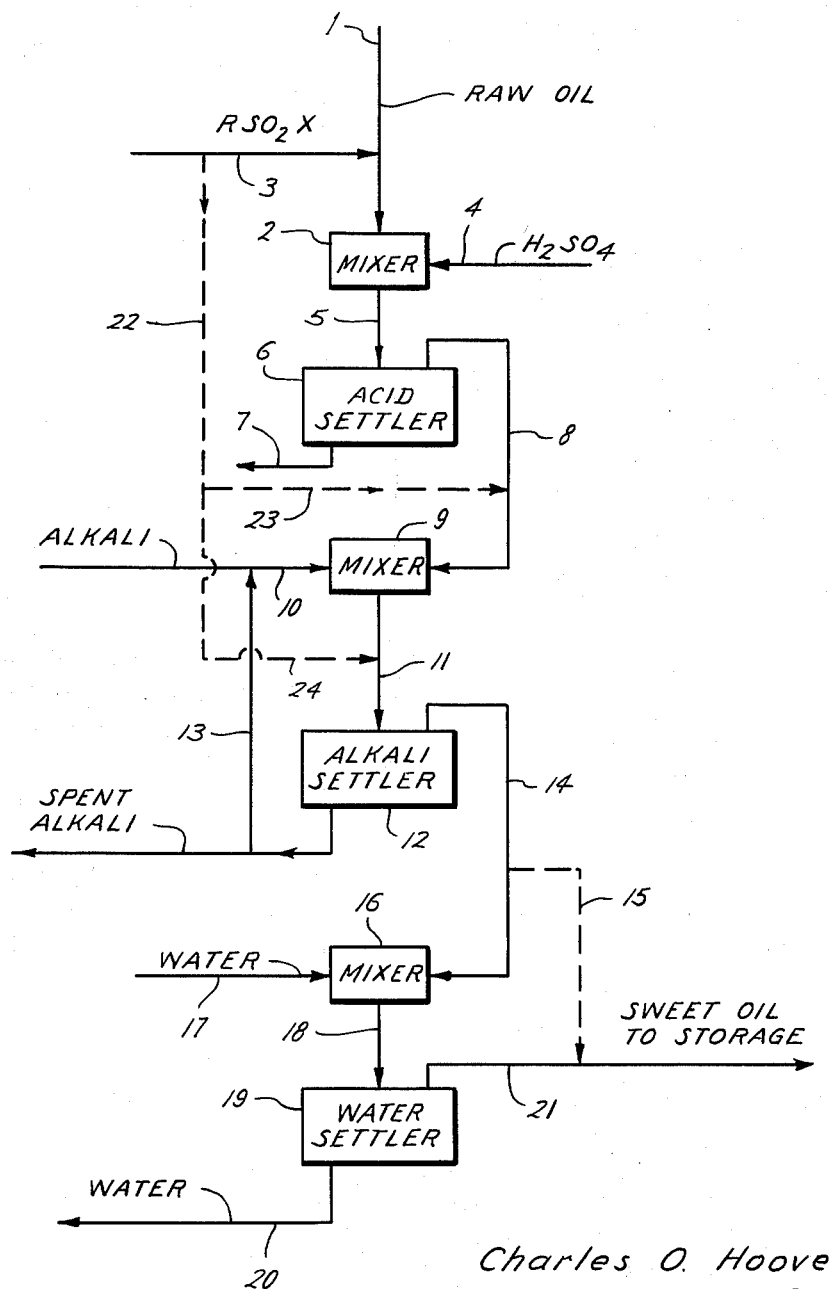

3,207,690
PROCESS FOR SULFUR REDUCTION AND SWEETENING OF HYDROCARBON OILS
Charles O. Hoover, P.O. Box 4294, Corpus Christi, Tex.
Filed Apr. 19, 1963, Ser. No. 274,284
17 Claims. (Cl. 208—204)

This invention is a continuation-in-part of my co-pending application Serial No. 175,831, filed February 26, 1962, now Patent No. 3,130,149, for Hydrocarbon Oil Sweetening Process.

This invention relates to a process for sweetening hydrocarbon oils, and more particularly to an improved process by which both sulfur reduction and sweetening of hydrocarbon oils may be accomplished.

Sweetening, as that term is commonly employed in the petroleum industry, refers, in general, to treatment of petroleum oils, generally distillates, by processes which will convert mercaptans contained in the oil to the corresponding disulfides. Such sweetening processes do not generally result in any reduction in the total sulfur in the original stock because, as noted, the mercaptans are merely converted to the disulfides, which are soluble in the oil and remain therein.

It is a primary object of the present invention to provide an improved process by which it is possible to obtain both a substantial reduction in the total sulfur content of the oil, as well as sweetening of the final product.

In the aforesaid co-pending application, I have disclosed a new liquid phase sweetening process for hydrocarbon oils which comprises successively admixing with mercaptan-containing oil, in any order, an organic sulfonyl halide and an alkaline reagent exhibiting the characteristics of a strong base.

The organic sulfonyl halide employed in the aforementioned sweetening process may be any compound of the general formula: $R-SO_2X$ where R is an alkyl or aryl nucleus, and X is a halogen.

The alkyl nucleus may be any straight or branched chain having one or more carbon atoms, some examples of which are ethanesulfonyl chloride, propane sulfonyl chloride, butane sulfonyl chloride, and the chain may be halogen substituted, as for example, trichloromethane sulfonyl chloride.

The aryl nucleus may be mono-cyclic or polycyclic and may be substituted, as with short alkyl groups, such as methyl, ethyl, etc., or may have other substituents. Examples of suitable aryl sulfonyl halides include the following: benzene sulfonyl chloride, p-toluene sulfonyl chloride, 2-naphthalene sulfonyl chloride, p-fluorobenzene sulfonyl chloride, 2,5-dichlorobenzene sulfonyl chloride, and p-bromobenzene sulfonyl chloride.

Although the number of available compounds usable in accordance with the present invention is exceptionally large, as noted, the particular reagent selected will be governed primarily by economic considerations of price and commercial availability; by efficiency from the standpoint of reactivity; and by its capacity for use at normal temperatures and pressures.

In view of these considerations, benzene sulfonyl chloride, which is normally a liquid soluble in petroleum, and p-toluene sulfonyl chloride, normally a solid but readily soluble in organic solvents such as toluene, have been found most desirable for use in accordance with this invention.

The alkaline materials which are effective reagents in the present sweetening process include any of the many compounds which exhibit the characteristics of a strong base. These include the alkali metal hydroxides, the quaternary ammonium hydroxides, sodium aluminate, soda-lime and the like. Also ion-exchange resins having strong-base characteristics are found to be functionally effective in the present process. Sodium hydroxide is generally preferred for its cheapness, availability, and its reaction efficiency particularly at normal temperatures and pressures.

The treating procedure is exceptionally simple, involving merely the mixing of each reagent with the oil to be treated and agitation for a short period of time. The sulfonyl halides, particularly the preferred p-toluene sulfonyl chloride or benzene sulfonyl chloride, being oil soluble, may first be dissolved in a suitable organic solvent, which may be the stock which is being treated. The quanity of the sulfonyl halide employed will be stoichiometrically related to the quantity of mercaptan present in the raw stock, being generally at least one-half mol of the halide per mol of mercaptan. In many instances, some excess of the halide, for example, one mol or more per mol of mercaptan may be employed.

The alkaline reagent will generally be in the form of a water solution, and may be added to the oil either before or subsequent to the addition of the sulfonyl halide. Various concentrations of sodium hydroxide, for example, may be employed, ranging from as little as 1% concentration to as much as 45–50% concentration. In general, that concentration will be selected which will give the quickest and most complete separation or "break" from the oil stock after completion of the treatment, and which is otherwise relatively free of mechanical difficulties in use. The alkaline reagent may also be stoichiometrically related to the mercaptan, being generally at least one mol per mol of mercaptan. Volumetrically, the quantity of alkaline reagent will be such as to assure thorough contact and ready separation, and in general, will be at least 5% by volume of the oil.

In some cases, the sulfonyl-halide treated oil may be percolated through or otherwise contacted with a solid alkaline reagent, such as soda-lime or sodium aluminate, such reagents being entirely effective for completing the sweetening reaction.

Amberlyst XN-1002, the hydroxyl form of a strong base ion-exchange resin, manufactured by Rohm & Haas, is another example of a solid contact material which is functionally effective as an alkaline reagent for the present process.

Still other alkaline reagents which are found to be effective for the purposes of this invention are the alkali solutions of various lead compounds, particularly lead plumbite, commonly employed in doctor sweetening of petroleum and made by dissolving lead oxide or litharge in water solutions of sodium hydroxide; lead chloride; and lead sulfate.

As noted from the foregoing, to effectively sweeten a hydrocarbon oil at least one-half mol of the organic sulfonyl halide is required per mol of mercaptan sulfur in the oil. In many cases the raw oil may contain such relatively large quantities of sulfur, including mercaptan sulfur, that use of the requisite quantity of the organic sulfonyl halide may become uneconomic. I have found that my new sweetening process may be combined with sulfuric acid treatment of such high sulfur-containing oil to produce not only a substantial reduction in the total sulfur content of the oil, but to also sweeten the oil.

In accordance with one embodiment of this invention, the oil containing various sulfur compounds, including mercaptans, may be treated with an appropriate quantity of sulfuric acid sufficient to reduce the total sulfur to any desired level. It is a characteristic of sulfuric acid treatment of sulfur-containing petroleum that the acid will react with many of the sulfur compounds and remove them from the oil. This is true, in part at least, with respect to the mercaptans in the oil. The sulfuric acid oxidizes at least some of the mercaptans to disulfides, which are soluble in the sulfuric acid and are removed upon settling of the acid sludge from the oil. However, unless excessive quantities of acid are used, a part of the sulfur compounds initially present will remain, including some mercaptans. The latter will still impart sourness to the oil after the acid reaction products have been removed and the oil neutralized and washed in the conventional manner.

I have found that by acid-treating of the oil to reduce the total sulfur and mercaptan content, I may effectively sweeten the oil by adding a quantity of organic sulfonyl halide to the acid-treated oil in the amount of at least one-half mol per mol of mercaptan sulfur remaining in the acid-treated oil. Upon addition of an appropriate quantity of a reagent exhibiting the characteristics of a strong base to the acid-treated organic sulfonyl halide-containing oil, the oil is rendered sweet to the conventional doctor test and the resulting product will also have a substantially reduced total sulfur content.

By thus reducing the total sulfur and mercaptan content of the oil by acid treating, the requisite quantity of organic sulfonyl halide will be substantially reduced and the overall cost, therefore, of sulfur reduction and sweetening of a given oil will be likewise substantially reduced.

Various petroleum stocks obtained from various types of crude oil may be successfully treated in accordance with this invention. Such stocks may be those obtained by straight run distillation and thermal and catalytic cracking and include straight run gasolines and pressure distillates, kerosenses and burning oils, jet fuels and the like, and containing from 0.001 percent to 1.0 percent or more by weight of sulfur including mercaptan sulfur.

The accompanying flow diagram illustrates procedures which may be followed in conducting the process in accordance with this invention.

Sour oil, for example, a raw kerosene stock containing various naturally occurring sulfur compounds, including mercaptans which normally impart sourness to the oil, will be supplied to the process through a line 1 and fed to a conventional mixer 2. In accordance with one embodiment of the present process, an appropriate quantity of a suitable organic sulfonyl halide, for example, para-toluene sulfonyl chloride, dissolved in toluene, will be fed through a line 3 into line 1, where it is admixed with the sour oil going to mixer 2. A quantity of sulfuric acid of appropriate strength will be fed through line 4 into mixer 2 and in the latter the acid will be mixed with the sulfonyl halide and the oil for a suitable length of time until the sulfuric acid has effectively reacted with those sulfur compounds which will react with acid of the quantity and strength employed. From mixer 2, the reaction mixture will be discharged through a line 5 into an acid settler 6 where the acid sludge will be separated from the treated oil and discharged from the process through a line 7. Acid settler 6 may be any type of settling tank or may be a conventional electrical precipitator which is commonly used for separating acid sludge from acid-treated oil. The acid-oil separated from the sludge in settler 6 will then be transferred through a line 8 into a second mixer 9 into which an alkali solution, such as aqueous sodium hydroxide, of suitable concentration and volume will be introduced through a line 10. In mixer 9, the alkali will neutralize the acid oil entering from line 8 and the neutralized mixture containing alkali solution will be discharged from mixer 9 through a line 11 into an alkali settler 12 where the neutralized oil will be separated from the alkali. The latter may be recirculated through line 13 into line 10. It will be understood, of course, that spent alkali will be removed from this circuit and fresh alkali added, as may be required.

The neutralized oil in settler 12 will be discharged through a line 14 and may be sent directly to storage through a line indicated by the broken line 15. Usually, however, the neutralized oil will be water-washed by sending it through line 14 into a mixer 16 where it is intimately agitated with fresh water from a line 17 and passes through a line 18 to a water settler 19. In the latter, the washed oil is separated from the water which is discharged through a line 20. The washed and finished oil is discharged from settler 19 through line 21 and thence to storage.

In determining the quantity of the sulfonyl halide to be used, a sample of the raw sour oil will first be treated with an amount of sulfuric acid, as intended to be used in the process, and the resulting product neutralized with alkali. An analysis will then be made of the neutralized oil to determine its remaining mercaptan content, and the quantity of organic sulfonyl halides will be calculated on the basis of the latter mercaptan content, namely, at least one-half mol per mol of mercaptan.

Instead of adding the organic sulfonyl halide to the raw oil as it enters the acid mixture, the sulfonyl halide may be added to the acid oil after it leaves acid settler 6. As indicated by broken line 22–23, the sulfonyl halide may be directed into line 8 as the acid oil leaves the acid settler 6. Thus, the sulfonyl halide will be added before addition of the alkali to the oil, but after acid treatment.

A further alternative procedure permits the sulfonyl halide to be added to the neutralized oil after it leaves mixer 9. This alternative is indicated by the broken line 24 between line 22 and line 11 through which the neutralized oil leaves mixer 9.

I have found that the addition of the sulfonyl halide ahead of the acid does not in any way undesirably affect the reactivity of the sulfonyl halide on the mercaptans. It appears that the sulfonyl halide will pass through the acid treating step completely unaffected in so far as its subsequent sweetening action is concerned. Similarly, as indicated, the sulfonyl halide may be added to the acid-treated oil before the addition of the alkali, or after the addition of the alkali to the acid-treated oil. In either case, the sweetening reaction occurs in the presence of the alkali.

As noted above, the quantity of alkaline reagent will generally be added in the proportion of at least one mol of alkali per mol of mercaptan sulfur. Since neutralization of the acid oil is also required, the quantity of alkali may be increased for that purpose.

Following are some examples of the combination process in accordance with this invention:

EXAMPLE 1.—PLANT SCALE

Raw Charge Stock—Kerosene
Total Sulfur Content—0.132% by weight
Mercaptan (RSH) Sulfur Content—0.106% by weight
Mercaptan Sulfur Content after Acid Treatment— 0.028% by weight The aforedescribed process has been employed on a commercial scale, being used to treat approximately 4200 barrels per day of kerosene stock in a continuous treating operation. The following data on the commercial operation are illustrative of the characteristics of the stock, the treating procedure and the results of the treatment.

*Treating procedure*

An approximately 25% solution in toluene of p-toluene sulfonyl chloride was added to the raw kerosene stock at the charge pump preceding the acid mixer. The amount of the sulfonyl halide which was added was calculated on the basis of one-half mol of the sulfonyl halide per mol of mercaptan sulfur remaining after acid treating, namely, 0.028%. At the acid mixer, 5 pounds of 88% $H_2SO_4$ per barrel of kerosene charge stock was added to the kerosene-sulfonyl halide mixture and thoroughly agitated therewith. This acid had previously been used for sulfuric acid alkylation. The acid-oil-sulfonyl halide mixture was then sent to an electrical precipitator in which the acid sludge was removed and the separated oil was sent to a second mixer where the acid oil was thoroughly agitated with a 15% aqueous solution of sodium hydroxide. The resulting mixture was sent to a settler where the alkali solution was separated from the oil and recirculated to the alkali agitator. When the alkali content dropped to about 4%, the alkali solution was replaced by fresh caustic solution. The oil separated from the alkali solution was sweet to the doctor test and was washed with water to remove the remaining traces of alkali. All operations were conducted at ambient atmospheric conditions of temperature and pressure.

The treated oil tested as follows:

Color: 30
Doctor: Negative
Total Sulfur: 0.103% by weight
Mercaptan Content: Nil It will be evident from the foregoing that the combined acid treating-sulfonyl halide sweetening process in accordance with this invention has reduced the total sulfur content of the kerosene stock from 0.132% to 0.103% and the mercaptan content from 0.106% to practically zero. The quantity of the p-toluene sulfonyl chloride required was reduced to approximately one-fourth the amount which would have been required for sweetening the kerosene stock in the absence of acid.

As noted previously, the reactive properties of the sulfonyl halide for sweetening the oil were entirely unaffected by the sulfuric acid, whether the sulfonyl halide was added to the charge before or during the acid treating or to the acid-oil before addition of the alkali. The amount of sulfonyl halide required was reduced directly in proportion to the reduction in mercaptan content as a result of the acid treatment. Similarly, the amount of alkali required for the sweetening reaction, since it bears a direct molal relation to the mercaptan sulfur, was reduced proportionately. Although some additional alkali was necessary to neutralize some by-product sulfonic acid and excess sulfuric acid remaining in the oil, this additional quantity is quite small and will depend upon the efficiency of the acid sludge separation step.

EXAMPLE 2.—LABORATORY SCALE

A raw kerosene distillate containing 0.126% by weight of total sulfur and 0.56% by weight of mercaptan sulfur was treated with 10 lbs. per barrel of 98% sulfuric acid, the sludge was separated; the acid oil neutralized with 15% caustic soda solution, and the treated oil separated. By this acid treatment and neutralization, the total sulfur was reduced to 0.058% by weight. The mercaptan sulfur was reduced to 0.0145% by weight. The oil was sour to the doctor test.

To another sample of the same raw distillate was added a quantity of benzene sulfonyl chloride calculated on the basis of 0.6 mol per mol of mercaptan sulfur remaining in the acid treated and neutralized oil as previously determined. This mixture was then treated with 10 lbs. per barrel of 98% sulfuric acid, the acid sludge settled and removed, the acid-oil neutralized with 15% caustic soda solution, and the treated oil separated from the caustic solution. The treating was conducted under ambient atmospheric conditions.

The treated oil tested as follows:

Total Sulfur—0.058% by weight
Mercaptan Sulfur—Nil
Doctor—Negative

As evident from the foregoing, the combined process reduced the total sulfur by 54%

$$\frac{0.126-0.058}{100}$$

and the mercaptan sulfur content was reduced 100%, the oil being rendered sweet to the doctor test.

EXAMPLE 3

The procedure of Example 2 was followed except that the benzene sulfonyl chloride was added to the acid-oil before neutralization by the caustic soda. The final product had the same total sulfur reduction and the final mercaptan content was nil, the oil, therefore, being sweet to the doctor test.

It will be evident from the foregoing that the processs in accordance with this invention provides a highly effective, simple and low cost process for de-sulfurizing and sweetening hydrocarbon oils.

Other variations and modification of the details of this invention will be apparent to those skilled in this art within the scope of the appended claims without departing from the spirit of this invention.

What I claim and desire to secure by Letters Patent is:

1. The process for sulfur reduction and sweetening of hydrocarbons oils, comprising, admixing with a mercaptan-containing hydrocarbon oil stock in the liquid phase a sulfur-reducing quantity of concentrated sulfuric acid and an organic sulfonyl halide, the additions of the reagents being made in any order, separating the acid reaction products from the oil stock, admixing with the separated oil stock an alkaline reagent exhibiting the characteristics of a strong base, and separating the treated oil stock from the resulting mixture.

2. The process according to claim 1 wherein said organic sulfonyl halide is a member of the class consisting of benzene sulfonyl chloride, p-toluene sulfonyl chloride.

3. The process according to claim 1 wherein said alkaline reagent is admixed with said oil stock in the proportions of at least one mol of alkali equivalent per mol of mercaptan sulfur remaining in the oil stock after treatment with said quantity of sulfuric acid.

4. The process according to claim 1 wherein said hydrocarbon oil stock is a kerosene stock.

5. The process according to claim 1 wherein said organic sulfonyl halide is an oil-soluble compound having the general formula: $R-SO_2-X$, wherein R is a radical selected from the class consisting of alkyl and aryl, and X is a halogen.

6. The process according to claim 8 wherein said alkaline reagent is an aqueous solution of sodium hydroxide.

7. The process according to claim 1 wherein said organic sulfonyl halide is admixed with said oil stock in the proportions of at least one-half mol of the sulfonyl halide per mol of mercaptan sulfur remaining in the oil stock after treatment with said quantity of sulfuric acid.

8. The process for sulfur reduction and sweetening of hydrocarbon oils, comprising, admixing with a mercaptan-containing hydrocarbon oil stock in the liquid phase a sulfur-reducing quantity of concentrated sulfuric acid, separating the acid reaction products from the oil stock, admixing with the separated oil stock in any order an organic sulfonyl halide and an alkaline reagent exhibiting the characteristics of a strong base, and separating the treated oil stock from the resulting mixture.

9. The process according to claim 8 wherein said alkaline reagent is an aqueous solution of sodium hydroxide.

10. The process according to claim 8 wherein said organic sulfonyl halide is an oil soluble compound having the general formula: $R-SO_2-X$, wherein R is a radical selected from the class consisting of alkyl and aryl, and X is a halogen.

11. The process according to claim 8 wherein said organic sulfonyl halide is admixed with the oil stock in the proportions of at least one-half mol of the sulfonyl halide per mol of mercaptan sulfur remaining in the oil stock after treatment with said quantity of sulfuric acid.

12. The process for sulfur reduction and sweetening of hydrocarbon oils, comprising, admixing with a mercaptan-containing hydrocarbon oil stock in the liquid phase an organic sulfonyl halide selected from the class consisting of p-toluene sulfonyl chloride and benzene sulfonyl chloride, treating the admixture with a sulfur-reducing quantity of concentrated sulfuric acid, separating the acid reaction products from the oil stock, contacting the acid treated oil with an aqueous solution of an alkali hydroxide, and separating the treated oil stock from the alkali solution.

13. The process according to claim 12 wherein said organic sulfonyl halide is admixed with the oil stock in the proportion of at least one-half mol per mol of mercaptan sulfur remaining in the oil stock after said treatment with sulfuric acid.

14. The process according to claim 12 wherein said alkali hydroxide is sodium hydroxide in a concentration of from about 1% to about 50% NaOH by weight of said solution and in the proportion of at least one mol of NaOH per mol of mercaptan sulfur remaining in the oil stock after said treatment with sulfuric acid.

15. The process for sulfur reduction and sweetening of hydrocarbon oils, comprising, treating a mercaptan-containing hydrocarbon oil stock with a sulfur-reducing quantity of concentrated sulfuric acid, separating the acid reaction products from the oil stock, admixing with separated oil stock in any order an organic sulfonyl halide selected from the class consisting of p-toluene sulfonyl chloride and benzene sulfonyl chloride and an aqueous solution of an alkali hydroxide, and separating the treated oil stock from the admixture.

16. The process according to claim 15 wherein the quantity of sulfonyl halide admixed with the acid treated oil stock is in the proportion of least one half mol per mol of mercaptan sulfur remaining in the oil stock after said treatment with sulfuric acid.

17. The process according to claim 15 wherein said alkali hydroxide is sodium hydroxide in a concentration of from about 1% to about 50% NaOH by weight of said solution.

References Cited by the Examiner

UNITED STATES PATENTS

| | | | |
|---|---|---|---|
| 2,651,596 | 9/53 | Krause | 208—222 |
| 2,773,805 | 12/56 | Vanderbilt et al. | 208—273 |
| 3,130,149 | 4/64 | Hoover | 208—204 |

ALPHONSO D. SULLIVAN, *Primary Examiner*.